INVENTOR.
FRANCIS P. DOWNING
BY Hugo G. Femman
ATTORNEY

United States Patent Office 2,823,215
Patented Feb. 11, 1958

2,823,215
PROCESS FOR RENDERING ANIMAL FAT

Francis P. Downing, Philadelphia, Pa., assignor to The Sharples Corporation, a corporation of Delaware Application October 4, 1956, Serial No. 613,980

2 Claims. (Cl. 260—412.6)

This invention pertains to the rendering of fat, and pertains more particularly to the rendering of animal fats for edible purposes.

Two basic systems have been in use for many years for the rendering of animal fats, one being known as wet rendering and the other as dry rendering. Both are batch processes utilizing relatively high temperatures over relatively long periods of time to release the fat from the animal tissue. Wet rendering is carried out in the presence of water, and dry rendering in the substantial absence thereof, but both employ heat to break down the protein cells to achieve a satisfactory yield of fat. The main disadvantage of these prior art methods is that the quality of the fat becomes degraded due to the use of relatively high temperatures for extended periods of time. This brings about in the fat a drop in stability, an increase in the content of free fatty acids, a darkening in color, and the development of undesirable odor. In order to produce a fat of high quality, subsequent treatment is required such as bleaching, deodorizing, etc. to remove these undesirable characteristics.

Considerable investigation has heretofore been carried out for purposes of avoiding the degrading of fat during rendering in which resort is had to systems operating under mild temperature conditions, use being made of mechanical grinding or comminution of the fat cells instead of relatively high heat to rupture the fat cells for purposes of releasing the fat.

The basic aim of any continuous rendering process is three-fold, namely, to produce a high grade fat product, to render large volumes of fat quickly, and to obtain high yields. In order to fulfill the first requirement the use of high temperatures for prolonged periods has been avoided by the above-mentioned mechanical rupturing of the fat cells at temperatures just sufficiently high to melt the fat, but considerable difficulty has heretofore been experienced in fulfilling the remaining two requirements due to problems experienced in the efficient separation of the fat from the protein and water present. The use of centrifugal equipment naturally suggests itself for the purpose, but due to the presence of a multiplicity of phases in the ground or comminuted mass, the problems involved in obtaining high yields of high grade fat at a high rate and within short rendering times have heretofore been left in considerable part unsolved.

When a ground or comminuted mass of the above character is permitted to settle at a temperature sufficiently high to maintain the fat fluid, four layers are formed from top to bottom in the following order. A fat layer is at the top, next underneath is a stable emulsion layer, then a water layer, and finally at the bottom a layer of heavy protein solids.

The difficulties in centrifugal separation reside primarily in the presence of the emulsion. Experience has shown that this emulsion is always formed when fat is ground or comminuted at relatively low temperatures but sufficiently high to melt the fat. This emulsion cannot be broken by the use of high centrifugal force, but is merely compacted thereby. Its magnitude can be cut down but its presence cannot be eliminated by diluting the feed to the centrifuge with a relatively large volume of water, but this introduces additional problems including a reduction in the useful capacity of the centrifuge, and the handling of an additional large volume of water in the recovery of the fat and protein. The major problem stems from the difficulty in continuously and efficiently separating and discharging the fat and the emulsion from the zone of centrifugation, without emulsion appearing in the discharged fat, or free fat appearing in the discharged emulsion. This difficulty has been effectively solved in the following manner.

The fat whether chilled, warm or at room temperature, is ground to an average particle size of from ¼ to ¾ inch. It is then heated to a temperature sufficiently high to render the fat fluid, e. g. above 130° F., but not sufficiently high to hydrolyze the collagen present, i. e. not above 160° F. The mass is then subjected to centrifugal separation for purposes of separating and discharging the major part of the solids present, i. e. between 70 and 80% of the solids. The liquid effluent which contains the fat, the emulsion, the water and the rest of the solids which are normally somewhat soft and mushy, is then passed through a comminutor wherein the rest of the solids are reduced to a fine state of sub-division, i. e. to a point where the largest dimension of a particle does not exceed 0.035". The mass is now treated with live steam to raise its temperature, i. e. to between 180 and 210° F., and to partially hydrolyze the rest of the collagen present to impart further softness and slipperyness. The mass is thus excellently prepared for subsequent centrifugal separation in a manner to be hereinafter fully described, whereby high yields of high quality fat are obtained free from emulsion, water and solids.

Additional features and advantages of this invention will become evident to persons skilled in the art as the specification proceeds and upon reference to the drawings in which.

Figure 1:
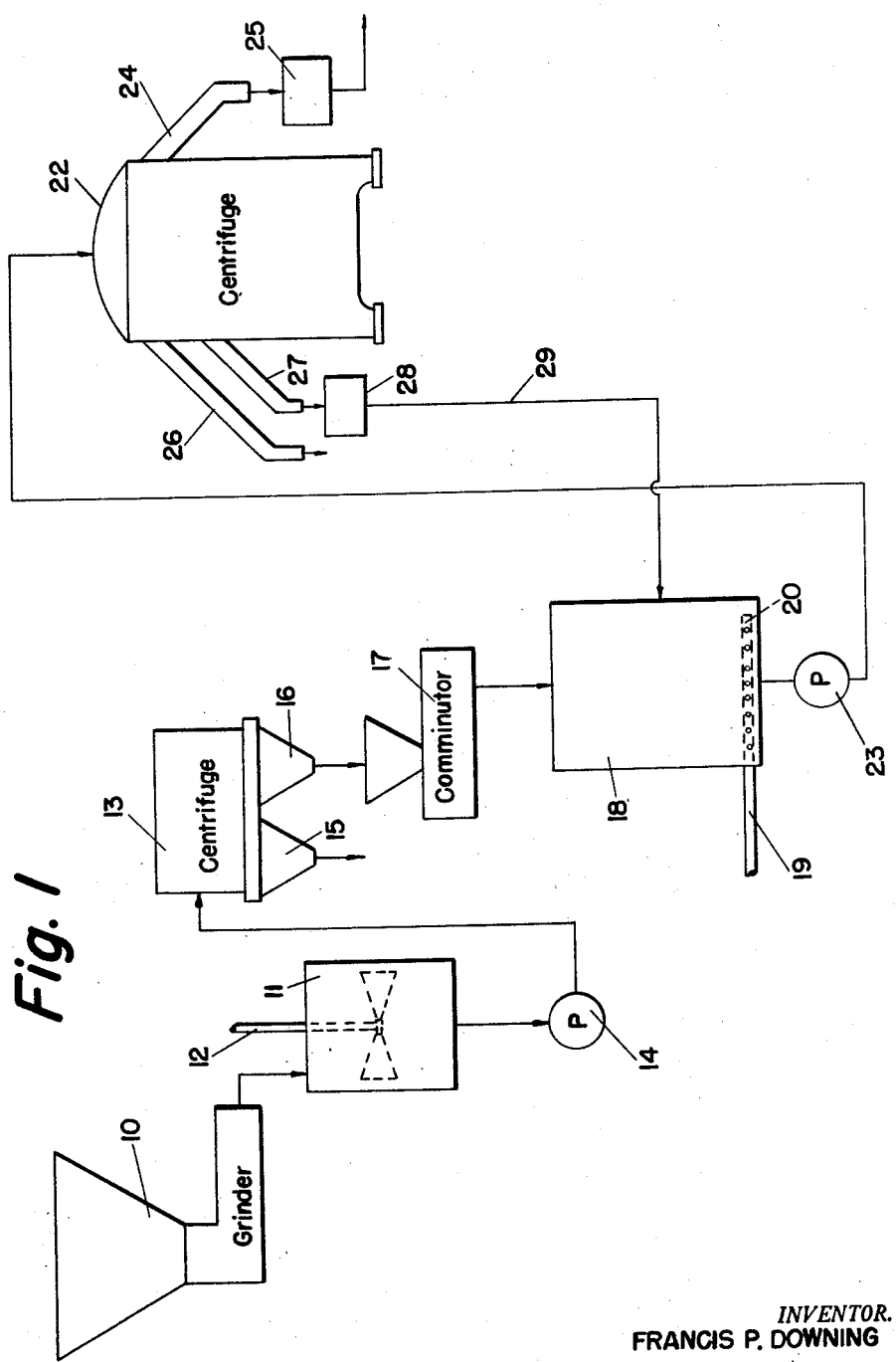
Figure 1 is a flow sheet diagrammatically illustrating the new process.

Referring now more particularly to Figure 1, at 10 is shown a grinder for grinding the fat at any desired temperature, that is, whether chilled, warm, or at room temperature. The grinding is such that the average particle size is between approximately ¼" and ¾". The ground fat is delivered to tank 11 having an agitator 12. Tank 11 is provided with means for raising the temperature of the fat to above its melting point, e. g. above 130° F., but due to the presence of water which is a normal constituent of animal fat, the temperature of the fat in tank 11 should not be carried above 160° F. Temperatures between 140° F. and 155° F. are preferred. This is to avoid hydrolysis of collagen which in hydrolyzed condition is not only of lower stability but is also very difficult to continuously separate in concentrated form centrifugally from the other constituents present, namely, the water, the emulsion and the fat, because its soft and slimy nature when hydrolyzed seriously interferes with the continuous discharge of the solids in concentrated form from the zone of centrifugation. The separation and recovery of the bulk of the protein in undegraded and concentrated condition is highly desirable as will be obvious.

Any suitable means may be employed for the indirect heating of the fat in tank 11, such as a heating coil, but I prefer to provide tank 11 with a jacket for heating purposes into which steam or hot water may be introduced to bring the fat up to the desired temperature. Agitator 12 assists in maintaining substantially uniform heating of the fat as it flows through tank 11.

The heated fat flows from tank 11 to centrifuge 13, pump 14 being illustrated for purposes of maintaining a substantially constant flow which is preferred. Centrifuge 13 is of the continuous solid-discharge type wherein the major part of the solids, i. e. between 70 and 80%, are removed in relatively dry condition from the rest of the mass and discharged as illustrated at 15. A typical centrifuge of this type is provided with a scroll for plowing the solids to a discharge point, typical of which is the centrifuge disclosed in U. S. Patents 2,679,974 and 2,703,676.

The liquid effluent separated in centrifuge 13, which contains the fat, the emulsion, the water and the rest of the solids is delivered therefrom at 16 and flows to comminutor 17 wherein the rest of the solids are finely divided to such an extent that the largest dimension of a particle does not exceed 0.035″. Comminutors suitable for the purpose are well known, and need not be further described.

The comminuted mass flows from comminutor 17 to tank 18 wherein it is treated with live steam to raise its temperature to between 180° F. and 210° F., and to subject the collagen to sufficient hydrolysis to increase the softness and slimyness of the solids and thus prepare them for efficient continuous centrifugal separation and discharge from the zone of centrifugation in a manner to be hereinafter more particularly described. Live steam may be introduced into the mass in tank 18 in any desired manner, a pipe 19 having perforations 20 within the tank 18 being illustrated for the purpose.

The heated mass flows from tank 18 to centrifuge 22, pump 23 being illustrated for purposes of maintaining the flow substantially constant which is preferred.

High quality fat in high yield is delivered from centrifuge 22 at 24 and is collected in tank 25 from which it is delivered to a suitable point not shown. The emulsion, the water and the remainder of the solids are delivered from centrifuge 22 at 26.

Figure 2:
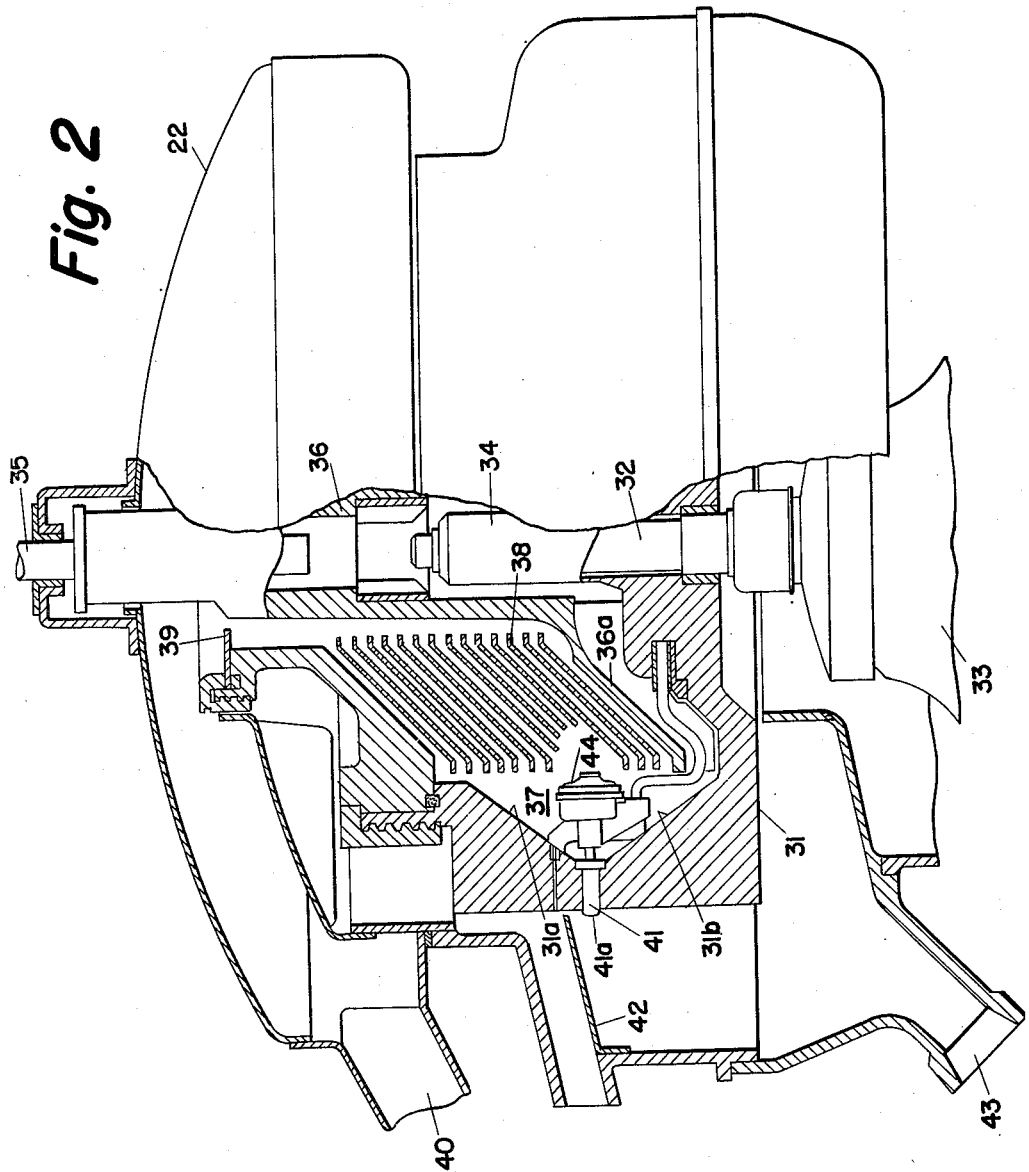
Figure 2 is an elevation partly in section illustrating a centrifuge useful in the final separation of the fat.

A suitable centrifuge for performing the operation of centrifuge 22 is illustrated in Figure 2.

Referring now more particularly to Figure 2, centrifuge 22 is illustrated as being of the type described in U. S. Patents 2,286,354 and 2,286,355. The rotor 31 is driven by a shaft 32, mounted for rotation within a support 33, and itself driven by any suitable form of motor, not shown. The rotor 31 is secured to a sleeve 34 which is secured to and rotates with shaft 32.

The mixture of fat, emulsion, water and solids is fed through a feed or inlet pipe 35 and flows downwardly through the space between tube 36 and sleeve 34 and outwardly below the skirt 36a on tube 36. The mass moves into the space or chamber 37 formed by the inclined walls 31a and 31b of the rotor 31. Efficient separation of the fat from the emulsion, water and solids takes place as the fat flows inwardly of the stratifying discs 38, and the emulsion, water and solids flow outwardly therefrom. The fat flows upwardly in the space adjacent the periphery of tube 36 and over a ring dam 39 for discharge by way of stationary outlet 40.

The emulsion, water and the solids present collect in the region of intersection of walls 31a and 31b and are discharged through opening 41a of bushing 41, and this discharged mass is deflected downwardly by frusto-conical skirt or ring 42 and is discharged from a chute 43. The deflecting skirt 42 may be supported in any suitable way, and serves to keep the latter discharge separate from the discharge and collection of valve operating fat through opening 82 to be hereinafter described.

Associated with each of a plurality of bushings 41 equally spaced around the periphery of rotor 31, is a valve operating assembly 44. Each assembly 44 and its function will be more particularly described in connection with Figure 3.

Figure 3:
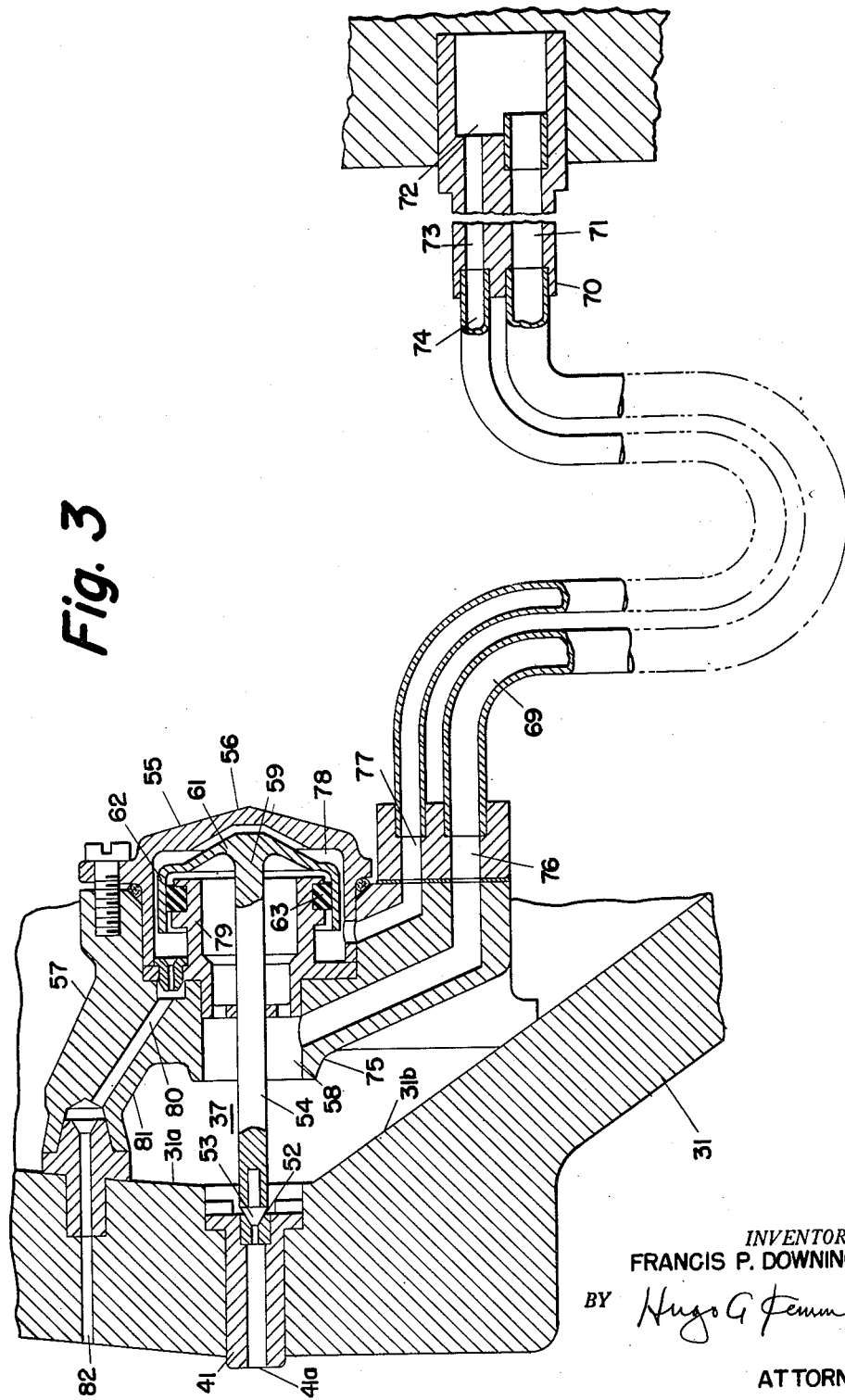
Figure 3 is a sectional elevation, partly diagrammatic, illustrating a valve and valve operating mechanism.

Referring now more particularly to Figure 3, a reciprocating valve member 53 is provided for coaction with each of the valve seats 52 positioned at the inner ends of bushings 41, and each of these valve members 53 is connected to a valve stem 54, which is actuated by means to be described hereinafter for intermittent discharge of deposited emulsion, water and solids through the bushings 41.

Fluid motors 55 operate to move the valves, individual motors being attached to each of the individual valve stems 54. The motors 55 and associated parts are secured within the rotor 31 for rotation therewith. Each of these motors 55 comprises a housing which consists of an end portion 56 and a base portion 57 to which the end portion 56 is secured. This housing surrounds the moving parts of the fluid motor. The base portion 57 has an annular extension 58 which lies adjacent but is suitably spaced from the juncture of walls 31a and 31b. The inner end 59 of the valve stem 54 is attached to piston 61 which is the moving member of the fluid motor 55.

The housing base 57 is provided with a lateral extension 75 through which liquid is passed from the main body of the rotor 31 for actuating the fluid motor.

A bore 76 in extension 75 communicates with the space 37 through the passage provided by the annular flange 58. The bore 76 is in turn connected with a conduit 69 which extends downwardly and inwardly around the lower end of the stack of discs 38 and skirt 36a. The inner end of conduit 69 is connected to a member 70 which has a bore 71 communicating with the conduit 69, and also a channel 72 communicating with the inner end of bore 71. A bore 73 extends outwardly from the channel 72, and is connected to a second conduit 74 which extends outwardly from the member 70 to a connection with a bore 77 in the lateral extension 75 of the housing base 57.

The bore 77 communicates with the space 78 between the inside of portion 56 of the housing and the outer surface of the piston 61 of the fluid motor 55. The inner surface of piston 61 communicates with the space 37 of the rotor through the hollow interior of the member 79 of the fluid motor, which is a stationary member having a cylindrical outer surface along which the flange 62 of piston 61 reciprocates, rubber ring 63 acting as a seal. The space 78 is also in communication through an orifice connecting this space with a bore 80 in an extension 81 of the base portion 57 of the motor housing, with an outlet 82 in the rotor wall through which motor actuating fluid is discharged from the machine. It will be noted that material discharged through the outlet 82 is discharged at a separate point from the mass discharged through the bushing 41, and this material is collected separately from said last-mentioned mass.

As centrifuge 22 is brought up to speed, valve member 53 is forced against valve seat 52 under the influence of centrifugal force on valve stem 54 and piston 61. Upon the feed of the mixture from tank 18 to centrifuge 22, the rotor begins to fill, and separation into phases starts to take place. The order of these phases is as explained above, i. e., solids, water, emulsion and fat arranged in layers progressing radially inward from the inner periphery of the rotor. Although during the start-up period the separation into phases is incomplete, the fat layer is quite fluid, and as it enters the extension 58 about valve stem 54, it eventually brings pressure to bear on the inside of piston 61 to move valve member 53 from seat 52. This opening of the valve during start-up, however, is only temporary, for as the body of feed mixture in the rotor becomes deeper, liquid fat enters bore 76, conduit 69 and bore 71, overflowing the radially inward end of the latter, (since ring dam 39 is nearer the axis of rotation) whereupon it enters bore 73, tube 74, bore 77 and space 78. The pressure on the fat due to centrifugal force causes the piston 61 to move radially outward to bring valve member 53 back into engagement with valve seat 52. This is assisted by the centrifugal force on piston 61 and valve stem 54. Although fluid fat escapes from space 78 through outlet 82, the flow entering bore 76 and leaving bore 77 is sufficient to offset this leakage, thus keeping the valve closed. The rotor is now in full operation and clarified liquid fat is discharged from the rotor over ring dam 39.

The respective layers of solids, water and emulsion build up radially inwardly in this order at the juncture of walls 31a and 31b, and emulsion eventually enters extension 58 and builds up therein. This prevents liquid fat from entering bore 76, and the resistance to flow of emulsion is such that the rate of leakage at outlet 82 exceeds the rate of flow (if any) of emulsion into bore 76, with the result that the hydrostatic pressure brought to bear on the interior of piston 61 becomes greater than the sum of the hydrostatic pressure on the outside of piston 61 plus the centrifugal force generated on the piston 61 itself and valve stem 54, with the result that piston 61 and valve stem 54 move radially inward to open the valve.

The solids which have been fluidized for peripheral discharge through the valve by communication in comminutor 17 followed by partial hydrolysis in tank 18 escape first, followed by water and then by emulsion. As emulsion recedes radially outward from extension 58, fat again enters bore 76 and is again delivered to space 78 to again cause piston 61 and valve stem 54 to move radially outward to close the valve. This cycle of operations is automatically repeated each time emulsion enters extension 58 to a sufficient extent to reduce or stop flow into bore 76.

As a result solids, water and emulsion are simultaneously and continuously separated from the fat, and are intermittently and automatically discharged from the periphery of the centrifuge 22 through bushings 41. The fat in highly clarified condition is delivered from the centrifuge at 40 after overflowing ring dam 39.

Any other suitable construction and arrangement for the peripheral discharge of the solids, water and emulsion separated from the fat may be substituted for the centrifuge shown in Figures 2 and 3, which had been described in detail to better describe the mode of operation of the new process.

The following example is by way of illustration and not of limitation.

5000 pounds of pork fat was passed in a continuous stream through a grinder having a plate with ⅜ inch diameter holes. The ground fat then passed through a steam jacketed tank provided with an agitator, and in which the ground fat was heated to approximately 150° F. The ground and warmed fat (the fat being in melted condition) was then pumped to a continuous solids-discharge centrifuge of the type disclosed in U. S. Patents 2,679,974 and 2,703,676 wherein solids were continuously separated from the fat, emulsion and water and discharged. A total of 700 pounds of protein solids having a moisture content of 60% and a fat content of 12.5% was thus removed from the mixture. These protein solids were in excellent condition, and were highly suitable for edible purposes, the original feed being of edible pork fat. The liquid effluent from the centrifuge was continuously passed through a comminutor known in the trade as a Fitzpatrick comminutor, wherein the remaining solids were reduced in size such that their largest dimension did not exceed 0.035". The stream leaving the comminutor was conducted to a tank wherein the mass was treated with live steam to partially hydrolyze the collagen and to raise its temperature to 195° F. The mixture at a temperature of 195° F. was continuously pumped to a centrifuge of the type described in connection with Figures 2 and 3 which discharged three streams, namely, clarified fat, valve sludge comprised of the solids, water and emulsion, and valve operating fat, each stream being collected separately. Since the valve operating fat, the latter being recovered and separately collected as it flows over the top of skirt 42, is normally of a composition similar to the composition of the mixture in tank 18, the valve operating fat was recycled by return to tank 18. This is illustrated in Figure 1, outlet 27 being for the discharge of valve operating fat, which is collected in tank 28 and recycled to tank 18 through line 29. The valve sludge was found to be in excellent condition for batch dry rendering to recover its values. The clarified fat was of high quality, and its yield was 71% based on total original feed.

Any other animal fat may be substituted in the above example with similar results. This includes beef fat, whale blubber, etc.

It is to be understood that the above particular description is by way of illustration, and that changes, omissions, additions, substitutions and/or modifications may be made therein without departing from the spirit of the invention. Therefore, it is intended that the patent shall cover the various features of patentable novelty that reside in the invention.

I claim:

1. A process for the rendering of animal fat which comprises reducing said fat to particle sizes ranging between ¼" and ¾", thereafter heating the mass to a temperature sufficiently high to melt the fat but not in excess of 160° F., subjecting the heated mass to centrifuging to remove between 70 and 80% of the solids, subjecting the solids in the rest of the mass to comminution to reduce the largest dimension of said last-mentioned solids to less than 0.035", thereafter subjecting said last-mentioned mass to treatment with live steam to raise its temperature to between 180° F. and 210° F. and to partially hydrolyze collagen contained therein, and subsequently subjecting said last-mentioned mass to centrifuging within said last-mentioned temperature range under conditions such that the clarified fat is discharged from the zone of centrifugation adjacent the axis thereof whereas the solids, water and emulsion contained therein are discharged peripherally from said last-mentioned zone of centrifugation.

2. The process of claim 1 wherein a separate stream of fat is employed within the zone of centrifugation for the operation of valves for the intermittent peripheral discharge of solids, water and emulsion, wherein said separate stream of fat is eventually peripherally discharged from the zone of centrifugation, and wherein said last-mentioned stream of fat after said discharge is recycled to the zone of centrifugation.

No references cited.